Patented Jan. 25, 1927.

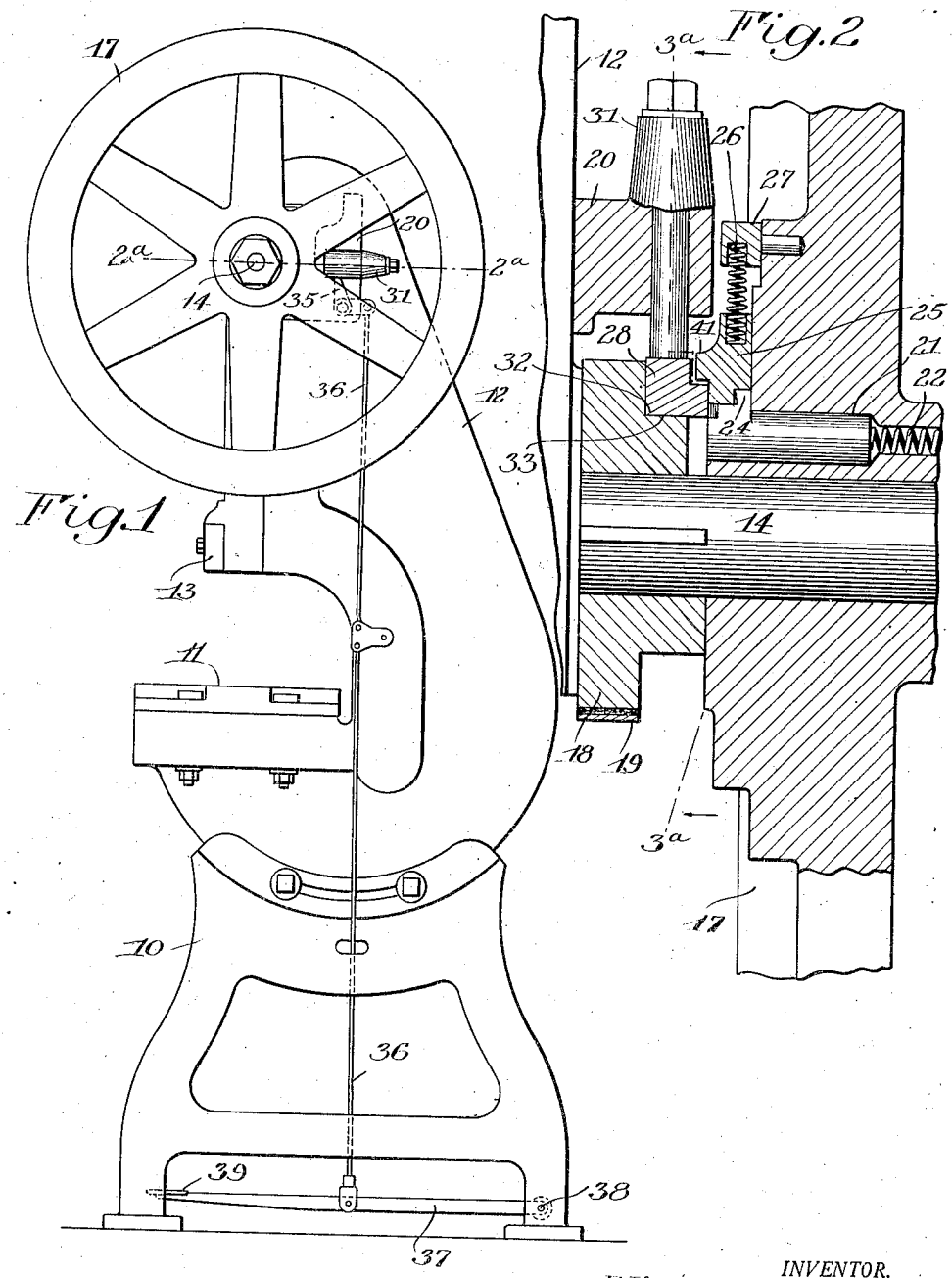

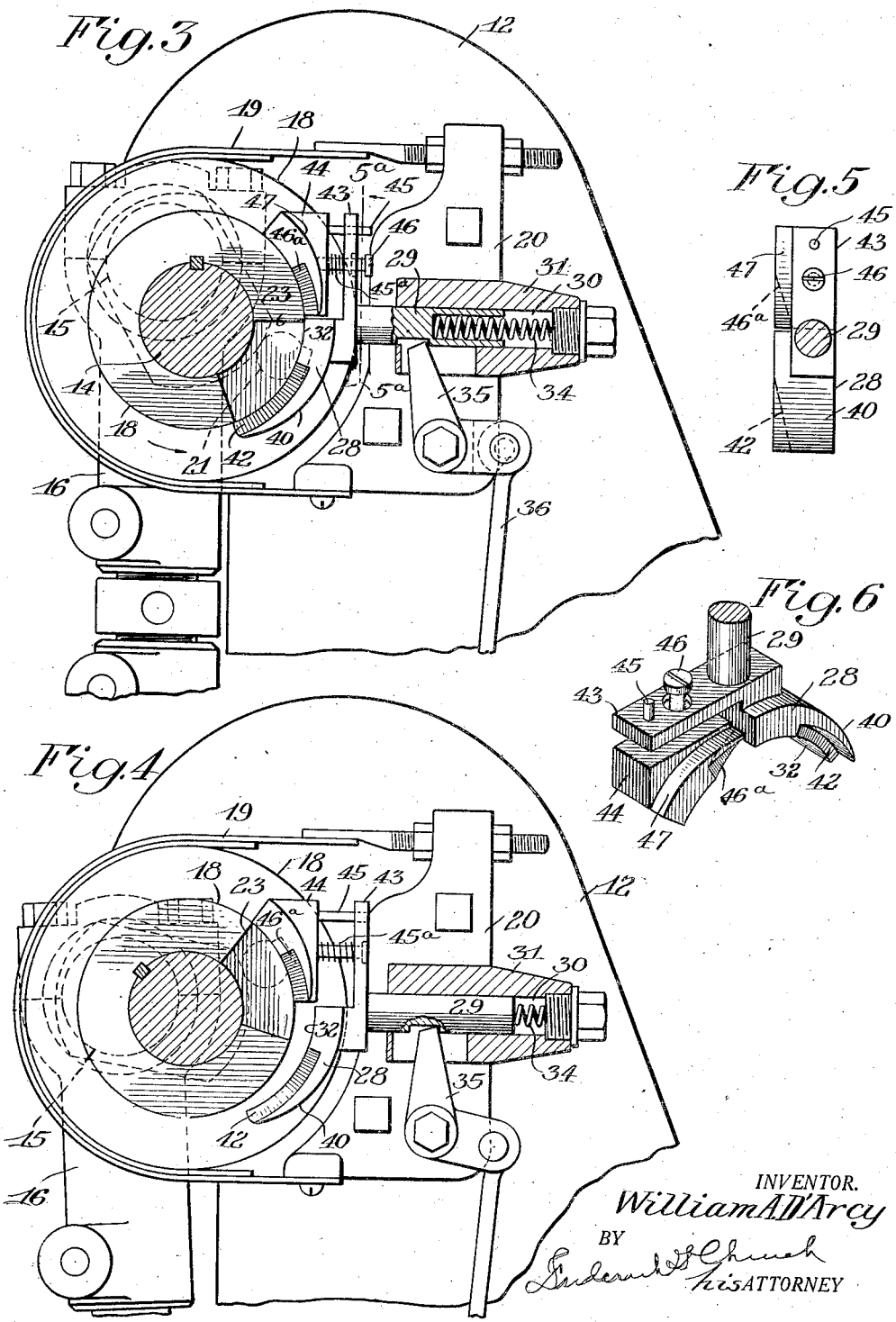

1,615,617

UNITED STATES PATENT OFFICE.

WILLIAM A. D'ARCY, OF ROCHESTER, NEW YORK.

SAFETY DEVICE FOR POWER PRESSES.

Application filed March 21, 1923. Serial No. 626,570.

This invention relates to safety devices for power presses, such for example as the well known variety having a head or ram reciprocating toward and from a work bed or die support. Such machines are commonly provided with treadle means for intermittently connecting a continuously rotating driving element, such as a pulley or flywheel, with the ram to cause single strokes of the latter, and it has been found that in operating the machine rapidly the actuating mechanism is frequently tripped before the work is completely or accurately inserted, with the result that the dies are damaged or the operator endeavors to extend the hand tardily beneath the descending head or ram for the purpose of positioning the work with resulting injury to the operator. One object of the present invention is to provide safety control devices by means of which the operation of the machine may be quickly interrupted and stopped after it has been started, but before the descent of the head or ram, to afford an opportunity for adjusting the work. Another object is to provide control means of the character requiring operation through a full stroke in order to effect actuation of the head or ram, thereby preventing premature actuations of the latter as for example, where the operating treadle is inadvertently depressed or only partially released after depression. To these and other ends the invention consists in certain improvements and combinations of parts, all as will be hereinafter more fully described, the novel features being pointed out in the claims at the end of the specification.

In the drawings:

Figure 1 is a side elevation of a power press embodying the present invention;

Figure 2 is an enlarged sectional view through the control devices on the line 2ª—2ª of Figure 1;

Figure 3 is an enlarged elevation partly in section, as seen from the line 3ª—3ª in Figure 2;

Figure 4 is a view similar to Figure 3, but showing the parts in different position;

Figure 5 is an enlarged detail view of parts of the mechanism as seen on the line 5ª—5ª of Figure 3, and Figure 6 is a perspective view of the parts shown in Figure 5.

Similar reference numerals throughout the several views indicate the same parts.

The invention is shown in the present instance by way of illustration as applied to a well known type of power press comprising a base portion 10 supporting a work bed 11 and a standard 12, the forward side of which is provided with the usual or any suitable guide means for a head or ram 13 reciprocated toward and from the work bed. Standard 12 is formed with suitable bearings for the main shaft 14 which has an eccentric portion 15, Figure 4, connected by means of a pitman 16 with the ram to reciprocate the latter. The concentric portion of shaft 14 at one end of the latter carries a continuously rotating fly wheel or pulley 17 driven by belt or other suitable means and this portion of the shaft adjacent pulley 17 has keyed thereto a disk 18, a portion of the periphery of which is engaged by a brake strap 19 for overcoming the inertia of the ram to quickly stop the latter when disconnected from the driving means. This strap is adjustably secured at its ends in any suitable manner to a block 20 carried on the side of the standard.

The actuating means for intermittently connecting and disconnecting the driving element or pulley 17 with the driven element or rotary part or disk 18, for moving the ram, comprises a bolt 21 sliding longitudinally in a bore in the hub of pulley 17. The bolt is pressed longitudinally by a spring 22 to move its outer end into a recess 23 formed in the disk 18, it being understood that the bolt when thus projected is carried by the continuously rotating pulley into registry and engagement with recess 23, thereby connecting the pulley with the shaft and ram to actuate the latter. The bolt has a lateral lug 24 adapted to be engaged by a latch 25 sliding transversely of the bolt in guideways on the pulley toward and from the bolt. A spring 26 between the latch and a keeper 27 on the pulley urges the latch to position to engage and retain the bolt after the latter is retracted by means described below, in a retracted or disconnected relation in which the pulley rotates idly on the main shaft.

The control devices comprise a shoe 28, Figure 3, carried on the end of a shank 29 sliding in a chamber 30 in a projecting portion 31 on the block 20. The shoe is thus supported for sliding movement substantially radially of the main shaft and is provided adjacent the latter with a curved surface 32 adapted to rest on an annular shoulder 33 on disk 18. A spring 34 in chamber 30 urges the shoe toward disk 18 and the shoe may be moved in the opposite direction by a bell crank lever 35 having the end of one arm thereof engaged in a recess in shank 29. The other arm of the lever is connected by means of a link 36 with a lever 37 pivoted at 38 on the base and having at its opposite end adjacent the front of the latter an operating treadle 39 the depression of which serves to move the shoe away from the disk 18.

Shoe 28 has the side thereof opposite the disk curved as at 40 to provide a cam surface adapted when the shoe is moved to one position to engage a lug 41 on latch 25 during the rotation of the pulley, to thereby raise or trip the latch and release bolt 21 which is moved outwardly by its spring and engages with the end of recess 23 of disk 18, thereby connecting the pulley and ram to operate the latter. After a complete single rotation of the parts, the outer end of bolt 21 engages a cam surface 42 on shoe 28 by means of which the bolt is moved to retracted or disconnecting relation and the ram brought to rest by its brake after each complete single operation. It is apparent from this construction that when the treadle is depressed the continuously rotating pulley is connected with the ram to effect a single complete operation of the latter, and that when once the treadle is depressed and the retaining means or latch 25 tripped, the movement of the ram continues through a complete operation except for the action of the safety device hereafter described.

The safety device is preferably carried by the control means or shoe already described, the latter having an upwardly extending arm 43 for such purpose. The safety device is preferably in the form of a second shoe 44 having a pin 45 and a bolt 46 sliding in openings in arm 43 to support shoe 44 for movement on shoe 28 toward and from disk 18, a spring 45ª being provided to urge the shoe toward the disk. This shoe is generally similar to shoe 28 described above, having a cam portion 46ª adapted in one position of the shoe to engage the outer end of bolt 21 to move the latter to disconnecting position and thus secure it behind latch 25. This shoe has also a cam surface 47 adapted when moved into position to engage and trip latch 25 to release the bolt and itself operate the ram.

In operation, with the pulley or flywheel 17 constantly driven, depression of treadle 39 as previously explained moves shoe 28 outwardly away from disk 18 and carries its cam surface 40 in the path of projection 41 on latch 25 as the latter rotates with the pulley to trip the latch and thereby release bolt 21 and connect the pulley and ram to operate the latter. But a momentary depression of the treadle is required, of course, for this purpose. If the treadle be fully depressed as in the normal operation of the machine, the head of bolt 46, engaging arm 43, carries shoe 44 away from disk 18 and out of the path of the bolt 21 so that the latter remains extended through a complete rotation until engaged by cam 42 of shoe 28, which has then returned after release of the treadle. The cam retracts the bolt and relatches the same so that the ram comes to rest ready for a second operation, as well understood in the art. If, however, after starting to depress the treadle the operator desires to adjust the position of the work, he can immediately release the treadle sufficiently at least to allow shoe 44 to return to the position shown in Figure 4, in which position it serves to retract or slide bolt 21 to disconnecting position and the ram is thus moved through but a small angle, coming to rest again substantially in or slightly beyond the position shown in Figure 4. After adjusting the work a second complete operation of the treadle causes cam surface 47 of shoe 44 to trip latch 25 and release the bolt in the next rotation of the latter with the pulley 17, so that the operation of the ram is completed. It is to be noted also that if the treadle is only partially depressed, as for example by an inadvertent blow or pressure, the parts are moved to the position shown in Figure 4 so that the ram, if started, is quickly stopped by the safety device or shoe 44, thus necessitating full depression of the treadle to cause descent of the ram. Furthermore if the operator intending to release the treadle after depression, does so only partially, the safety shoe 44 is moved to position as shown in Figure 4 to prevent an inadvertent repetition of operation of the ram.

The invention thus provides a simple, practical and convenient control mechanism by means of which the press may be operated not only efficiently but with increased safety to the operator, and less frequent damage to the dies, and is obviously applicable not only to new presses but also to a large number of presses now in use.

I claim as my invention:

1. In a machine of the class described, the combination of driving and driven elements, actuating means for connecting and disconnecting said elements to effect successive operations of said driven element, control means cooperating with said actuating means for starting an operation of said driven element, and a safety device comprising cooperating parts mounted independent of the actuating means and operated by the control means to disconnect said driving and driven elements before an operation of the latter is effected.

2. In a machine of the class described, the combination of driving and driven elements, actuating means for connecting and disconnecting said elements, control means cooperating with said actuating means for connecting said elements to start an operation of said driven element and for disconnecting said elements to stop said driven element at the end of each complete operation thereof, and a safety device movable relative to and by said control means into cooperation with said actuating means after connection of said elements by said control means for disconnecting said elements and preventing an operation of said driven element.

3. In a machine of the class described, the combination of driving and driven elements, actuating means movable to connect and disconnect said elements to effect successive operations of said driven element, spring means tending to move said actuating means to connecting position, retaining means for holding said actuating means in disconnecting position, control means for tripping said retaining means to release said actuating means and start an operation of said driven element, and a safety device movable relative to and by said control means to return said actuating means after release to disconnecting position for preventing an operation of said driven element.

4. In a machine of the class described, the combination of driving and driven elements, a sliding bolt on one of said elements and coacting means on the other for intermittently connecting and disconnecting said elements to effect successive operations of the driven element, means tending to slide said bolt into connecting relation, a latch for retaining said bolt in disconnecting relation, control means including a cam and an operating device therefor for tripping said latch to start an operation of said driven element, and for sliding said bolt to disconnecting relation at the end of each operation, and safety cam means adapted to be moved by said cam operating device to position to return said bolt to disconnecting position after the tripping of said latch to prevent operation of said driven element.

5. In a machine of the class described, the combination of a ram having a rotary actuating part, a rotary driving element, a spring actuated bolt slidably carried by said element for driving engagement with said part, a latch on said element for retaining said bolt in disengaged relation, cam control means for tripping said latch to start an operation of said ram and for disengaging and relatching said bolt at the end of each operation, and a cam device movable into the path of said bolt in rear of said control means for disengaging and relatching said bolt to prevent an operation of said ram started by said control means.

6. In a machine of the class described, the combination of a ram having a rotary actuating part, a rotary driving element, a spring actuated bolt slidably carried by said element for driving engagement with said part, a latch on said element for retaining said bolt in disengaged relation, a device movable into the path of said latch for tripping the same and starting an operation of said ram, a second device carried by the first device for movement into the path of said bolt to relatch the same and interrupt an operation of the ram started by said first device, and operating means for said devices.

7. In a machine of the class described, the combination of revoluble driving and driven elements, an adjustable coupling device for said elements, and operating means for said device comprising two relatively movable parts, each of which is adapted to control said coupling device whereby to effect coupling and uncoupling of said elements during a single revolution of the driven element, one of said parts being under the control of the other, and manually operable means for moving said parts to release position one subsequent to another.

8. In a machine of the class described, the combination of revoluble driving and driven elements, an adjustable coupling device for said elements including means for automatically moving it into coupling position, a latch for locking the coupling device in noncoupling position, a control member adapted to automatically release said latch at a predetermined point during rotation of the driven element, said member being adapted to prevent operation of the coupling device subsequent to the release of said latch, and means for moving said member to permit connection of the driving and driven elements by the coupling device.

9. In a machine of the class described, the combination of revoluble driving and driven elements, an adjustable coupling device for said elements including means for automatically moving it into coupling position, a latch for locking the coupling device in noncoupling position, a control member adapted to automatically release said latch at a predetermined point during rotation of the driven element, said member being adapted to prevent operation of the coupling device subsequent to the release of said latch, and means for moving said member to permit connection of the driving and driven elements by the coupling device, a second member for moving the coupling device to release position and common operating means for said second member and said control member.

10. In a machine of the class described, the combination of revoluble driving and driven elements, an adjustable coupling device movable with the driving element, separate members in the path of the coupling device for automatically moving it to release position, each of which is adapted to hold the coupling device at release position and both being releasable to permit recoupling of said elements by said adjustable device and common means for successively moving said separate members to release position.

11. In a machine of the class described, the combination of revoluble driving and driven elements, a coupling device for connecting and disconnecting said elements, control means for said device comprising two relatively movable parts, each of which is adapted to move said coupling device to release position, one of which is coupled to and adapted to move subsequent to the other, and operating means for the last mentioned part.

12. In a machine of the class described, the combination of driving and driven elements, a coupling device adapted to connect and disconnect said elements, means for actuating said device, locking means for said device, an actuating member adapted to periodically release said locking means and also adapted to hold said coupling device in nonoperative position after its release, and means for moving the actuating member to permit advancement of said coupling device into position to connect said driving and driven elements.

WILLIAM A. D'ARCY.